(12) United States Patent
Ohkura et al.

(10) Patent No.: US 6,405,819 B1
(45) Date of Patent: Jun. 18, 2002

(54) VEHICLE COOLING STRUCTURE

(75) Inventors: Kenji Ohkura; Michiharu Imayasu; Takashi Chirifu, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/612,246

(22) Filed: Jul. 7, 2000

(30) Foreign Application Priority Data

Jul. 9, 1999 (JP) ............................................. 11-196259
Aug. 23, 1999 (JP) ............................................. 11-235950

(51) Int. Cl.⁷ ............................................. B60K 11/04
(52) U.S. Cl. ..................................... 180/68.1; 293/115
(58) Field of Search ................................ 293/113, 115; 180/68.1, 68.4, 68.6, 68.2, 68.3

(56) References Cited

U.S. PATENT DOCUMENTS

| | | | | |
|---|---|---|---|---|
| 1,982,293 A | * | 11/1934 | Green ........................ | 180/68.6 |
| 2,071,673 A | * | 2/1937 | Whitlock .................... | 180/68.6 |
| D117,492 S | * | 11/1939 | Cadwallader ............... | 293/113 |
| 2,329,874 A | * | 9/1943 | Cadwallader et al. ....... | 293/115 |
| 2,578,068 A | * | 12/1951 | Johnson ...................... | 293/113 |
| 3,888,327 A | * | 6/1975 | Reece ........................ | 180/68.6 |
| 4,143,732 A | * | 3/1979 | Schmude et al. ........... | 293/115 |
| 4,403,648 A | * | 9/1983 | Styok ......................... | 180/68.6 |
| 6,012,761 A | * | 1/2000 | Hellhake et al. ............ | 293/115 |
| 6,041,878 A | * | 3/2000 | Daniels et al. ............. | 180/68.6 |

FOREIGN PATENT DOCUMENTS

| JP | 63-15078 | 4/1988 | ........... B60R/19/00 |
|---|---|---|---|
| JP | 10-324206 | 12/1998 | ........... B60R/19/52 |

* cited by examiner

*Primary Examiner*—Michael Mar
(74) *Attorney, Agent, or Firm*—Sughrue Mion, PLLC

(57) ABSTRACT

A vehicle cooling structure comprises a bumper louver 8 attached in an opening formed in a front bumper so as to open at a position facing a lower portion of a radiator 5 in such a manner as to avoid a bumper beam, air duct plates 10 formed integrally with the bumper louver 8 in such a manner as to be inclined rearward, and left and right guide plates and a lower guide plate detachably attached to a front bulkhead for aggressively guiding running air introduced from the opening toward the radiator.

17 Claims, 15 Drawing Sheets

VEHICLE COOLING STRUCTURE

BACKGROUND OF THE INVENTION

1. Field of the Invention

The present invention relates to a vehicle cooling structure.

2. Description of the Related Art

Conventionally, in a vehicle in which a radiator for an engine or the like is accommodated in a front part of the body of the vehicle, as disclosed in Japanese Patent Unexamined Publication No. Hei. 10-324206(JP-A-10-324206), a radiator grille and a bumper grille are provided in front of the radiator not only to protect the radiator against a damage by a flying gravel but also to introduce cooling air to the radiator.

On the other hand, with a view to improving the aerodynamic performance, there has been conceived a vehicle body shape design in which the surface of a bonnet is curved so that the front part of the body of a vehicle is lowered as low as possible, and in such a design, the vertical width of a front grille (a radiator grille) which extends in a vertical direction of the body narrows. In this case, to compensate for the radiator grille that narrows due to the design, the amount of cooling air taken into through the bumper grille may be increased, but there is a limit to the opening increase while securing the function required for the bumper.

Cooling air introduced through the front grille is applied to an upper part of the radiator, while cooling air introduced through the bumper grille is applied to a lower part thereof, and therefore there is a risk that the insufficient amount of cooling air is to be applied to a central part of the radiator. If the opening through which cooling air is introduced, however, is widened, there is caused a problem that the CD value (coefficient of drag) gets worse and hence the aerodynamic performance is deteriorated.

Japanese Utility model examined Publication No. Shou. 63-15078(JP-B-63-15078U) discloses a conventional vehicle cooling structure.

As shown in FIG. 16, an engine 01 is mounted in an engine compartment which is positioned at the front part of the body of a vehicle, and a radiator 05 is mounted at the front part of the engine compartment. In addition, an under guard 011 is attached to the engine compartment at the bottom thereof for covering the engine 01 from below. In the disclosed vehicle cooling structure, an outside air intake window 012 is formed in the under guard 011.

A part of a flow of air generated when a vehicle runs or running air which passes through the radiator 05 flows along the upper surface of the under guard 011 and joins another flow of running air taken into the engine compartment through the outside air intake window 012 in the vicinity of the outside air intake window 012. The flows of running air which has so joined each other then cools an output drive shaft 03 of the engine 01.

In the aforesaid conventional technique, however, there exists a relatively large gap between the body of the vehicle and the radiator 05. If much of the running air enters the engine compartment through this gap, in other words, if there is much running air which bypasses-the radiator 05, or so-called bypassed air, the cooling efficiency of the radiator 05 is affected.

Furthermore, the flow of running air which enters the engine compartment also affects the air resistance which a vehicle receives when it is running. In general, if of the running air taken into from the front part of the vehicle bypassed running air gets more than running air passing through the radiator, the air resistance tends to increase.

Moreover, when driven in snow, if there is much bypassed running air, snow tends to be allowed to easily enter the engine compartment.

SUMMARY OF THE INVENTION

To this end, an object of the invention is to provide a cooling structure for cooling uniformly and efficiently a radiator for a water-cooled engine.

With a view to attaining the above object, according to a first aspect of the invention, there is provided a cooling structure in which an opening (3) is formed in a front bumper (1) at a position facing a lower part of a radiator (5) installed at the front part of the body of a vehicle, and in which a bumper louver (8) is provided in the opening (3) which has air duct plates (10) provided integrally in an inclined fashion so as not only to direct cooling air toward a central portion of the radiator (5) but also to shield the opening (3) when viewed from the front of the vehicle body.

According to this construction, cooling air entering the interior of the vehicle body from the opening facing the lower part of the radiator can be directed toward the central part of the radiator, and therefore, even if the opening is formed in the front bumper at the position facing the lower part of the radiator, it is possible not only to prevent the deterioration of cooling effect of the radiator but also to improve the CD value because the opening is shielded by the air duct plates when viewed from the front of the vehicle body.

In addition, a plurality of vertical furring strips (3a) are provided in the opening (3), and the bumper louver (8) has vertical bars (8a) adapted to engagedly attach to the vertical furring strips (3a) and the air duct plates (10) integrally formed so as to extend across the vertical bars (8a). The air duct plates (10) are each formed so as to have substantially V-shaped cross-sectional configurations only in the vicinity of the vertical bars (8a) and are connected to the vertical furring strips (3a) at free end portions of the substantially V-shaped cross-sectional configuration. According to this construction, the vertical bars are to be positioned on a downstream side of cooling air relative to frontal protruding ends of the air duct plates, and this improves the straightening effect on cooling air. Moreover, the deterioration in rigidity of the air duct plates 10 due to the construction in which the frontal protruding ends of the air duct plates are positioned frontward can be prevented by allowing the air duct plates to be connected to the vertical bars at the free ends of the substantially V-shaped cross-sectional configuration.

In order to cool the radiator for the water-cooled engine disposed rearward of the face of the bumper with running air introduced through the opening formed according to the first aspect of the invention, it is preferable to detachably attach to a front bulkhead left and right guide plates and a lower guide plate which are adapted to guide running air introduced through the opening to the radiator.

According to the aforesaid construction, the running air introduced through the opening can be directed more aggressively to the radiator for the water-cooled engine with the left and right guide plates and lower guide plates. This decreases the amount of the running air entering the engine compartment without passing through the radiator, or the so-called bypassed running air. Thus, the radiator can be cooled more efficiently by allowing a sufficient amount of running air to be taken into to pass through the radiator.

Moreover, since there exists little bypassed running air, the air resistance the vehicle receives while running decreases, and the amount of snow penetrating into the engine compartment while running in snow also decreases.

DETAILED DESCRIPTION OF THE PREFERRED EMBODIMENT

Figure 1:
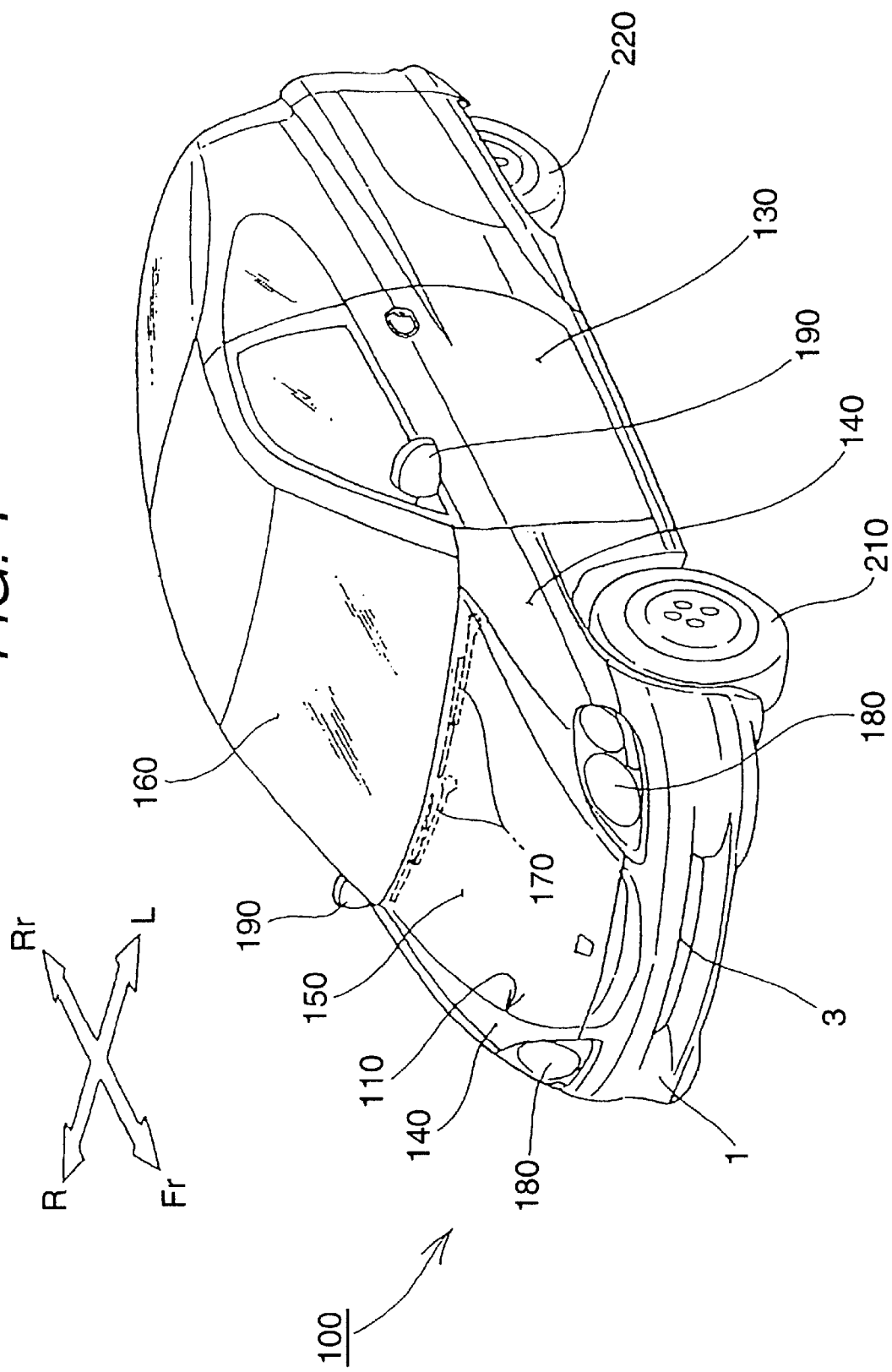
FIG. 1 is a perspective view of a vehicle to which the invention is applied.

Embodiments of the invention will be described with reference to the accompanying drawings. Terms such as "front," "rear," "left," "right," "upper," and "lower" denote such directions as viewed from the driver, and Fr denotes the front side, Rr denotes the rear side, L denotes the left-hand side, R denotes the right-hand side and CL denotes the center of the width of the vehicle (the vehicle body center). In addition, the accompanying drawings are to be seen in a direction in which reference numerals are oriented.

FIG. 1 is a perspective view of a vehicle provided with a cooling structure according to the invention, and the vehicle 100 is shown as a two-door passenger car having an engine compartment 110 provided at a front part of the body of the vehicle, a bumper face 120 attached to a lower portion of the front part of the vehicle body and left and right doors 130 attached to the sides of the vehicle body. In the figure, reference numerals 140, 140 denote front fenders, 150 denotes a bonnet, 160 denotes a windshield, 170, 170 denote wipers, 180, 180 denote headlamps, 190, 190 denote rear-view mirrors, 21 a front wheel and 22 a rear wheel.

Figure 2:
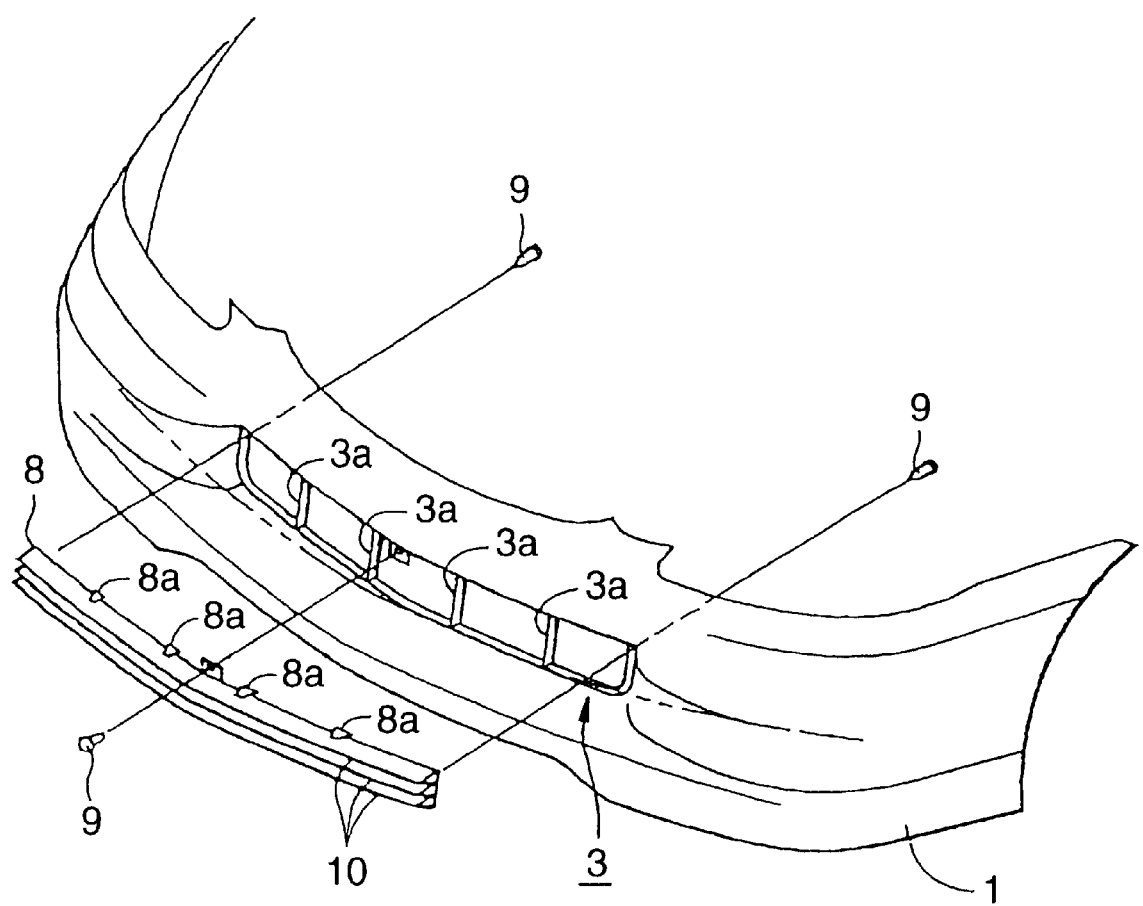
FIG. 2 is a perspective view of a front bumper for a vehicle according to the invention.
Figure 3:
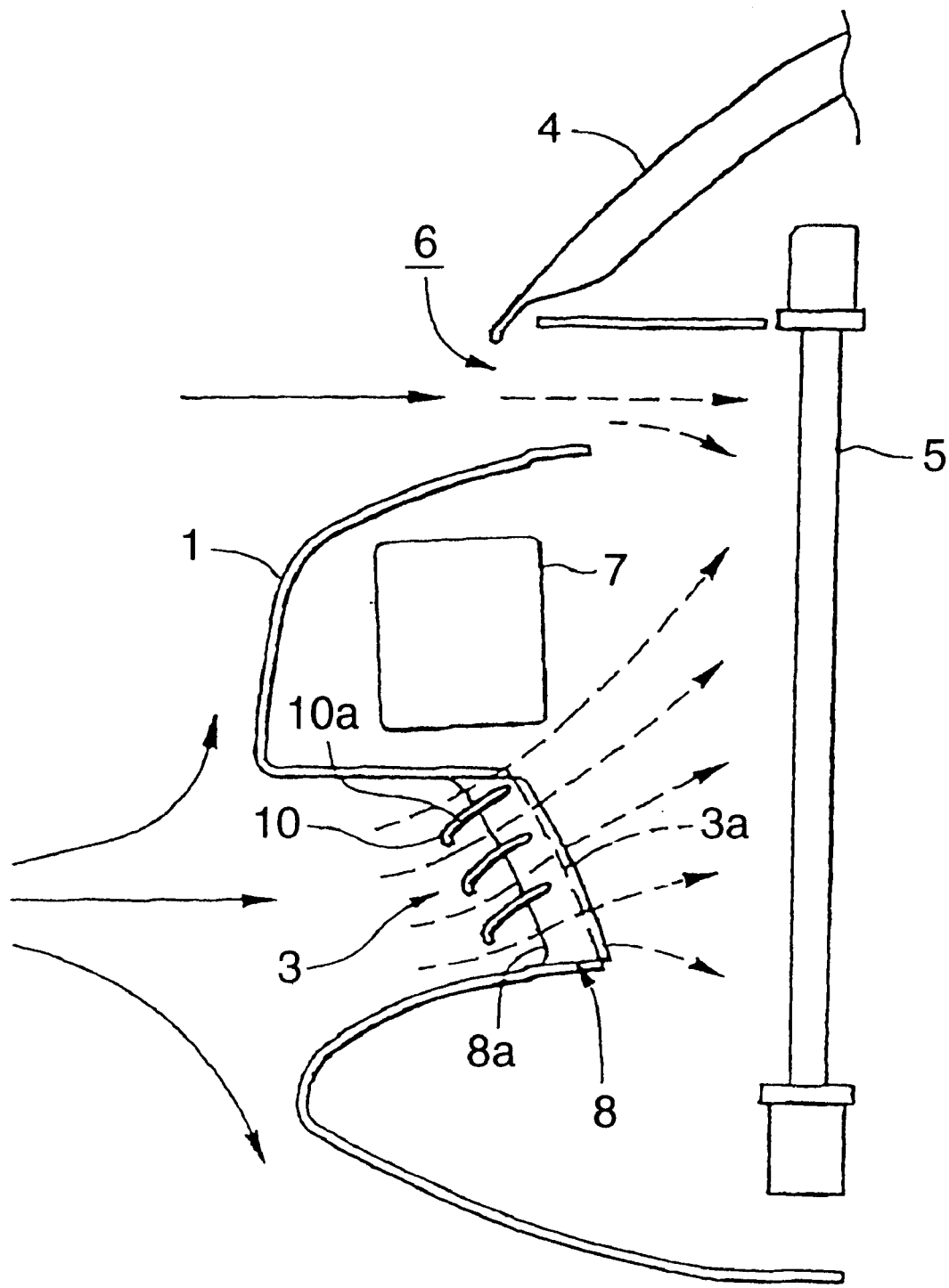
FIG. 3 is a vertical cross-sectional view showing a main portion of a front part of the body of the vehicle.

FIG. 2 is a general perspective view showing a front bumper 1 and a bumper louver 2 which are constructed according to the cooling structure of the first embodiment of the invention applied to the vehicle 100 shown in FIG. 1. FIG. 3 is a vertical cross-sectional view showing a main part of the front part of the body of the vehicle including the front bumper 1. As shown in FIG. 2, an elongate opening 3 is formed in a central portion of a frontward protruding portion of the front bumper 1 and the opening elongates in the transverse direction of the vehicle body.

As also shown in FIG. 3, the opening 3 is formed deep in the front bumper 1 on the rear side thereof relative to the longitudinal direction of the vehicle body, and the opening area is constructed so as to get narrower from the frontward protruding surface to the opening 3 by upper and lower and left and right walls. Note that the opening 3 is constructed so as to extend longer in the transverse direction of the vehicle body on the front protruding surface side of the bumper than on the rear side thereof relative to the vehicle body.

As shown in FIG. 3, a radiator 5 is disposed rearward of the front bumper 1, i.e., below a front end portion of a bonnet 4 relative to the longitudinal direction of the vehicle body. This radiator 5 is cooled by cooling air introduced from a body side opening 6 formed between an upper end of the front bumper 1 and the front end of the bonnet 4 and the opening 3 formed in the position facing a lower portion of the radiator 5.

The radiator 5 is, as shown in FIG. 3, installed such that it extends between in the vicinity of the front end portion of the bonnet 4 and in the vicinity of a lower end portion of the front bumper 1 and vertically central and lower portions on a frontal side of the radiator 5 relative to the longitudinal direction of the vehicle body are covered by the front bumper 1. Although an upper portion of the radiator 5 is exposed to air introduced from the aforesaid body side opening 6 as cooling air, as to the central and lower portions of the radiator 5, air introduced from the opening 3 needs to be guided toward those portions as cooling air.

To secure the function of the -bumper, as shown in FIG. 3, a bumper beam 7 extending in the transverse direction of the vehicle body is, accommodated in the front bumper 1 at an upper portion thereof (on the body side). Therefore, since the opening 3 is formed in the front bumper 1 at a lower portion thereof so as to avoid the bumper beam 7, it is desirable to guide cooling air introduced from the opening 3 toward the central portion of the radiator 5 (positioned upwardly of the opening 3).

According to the first embodiment of the invention, in order to provide a louver for guiding cooling air toward the central portion of the radiator 5, a bumper louver 8 is attached in the opening 3. Note that in this illustrated example, the bumper louver 8 is detachably secured to the front bumper 1 with attaching machine screws 9 at three positions as shown in FIG. 2.

A plurality of vertical furring strips 3a are formed in the opening 3 integrally with the front bumper 1 when the front bumper 1 is processed, and provided on the bumper louver 8 are a plurality of vertical bars 8a which are shaped so as to cover the respective vertical furring strips 3a when the bumper louver 8 is attached in the opening 3 and a plurality of air duct plates 10 (three air duct plates being shown in FIG. 3) which extends across the respective vertical bars 8a.

Figure 4:
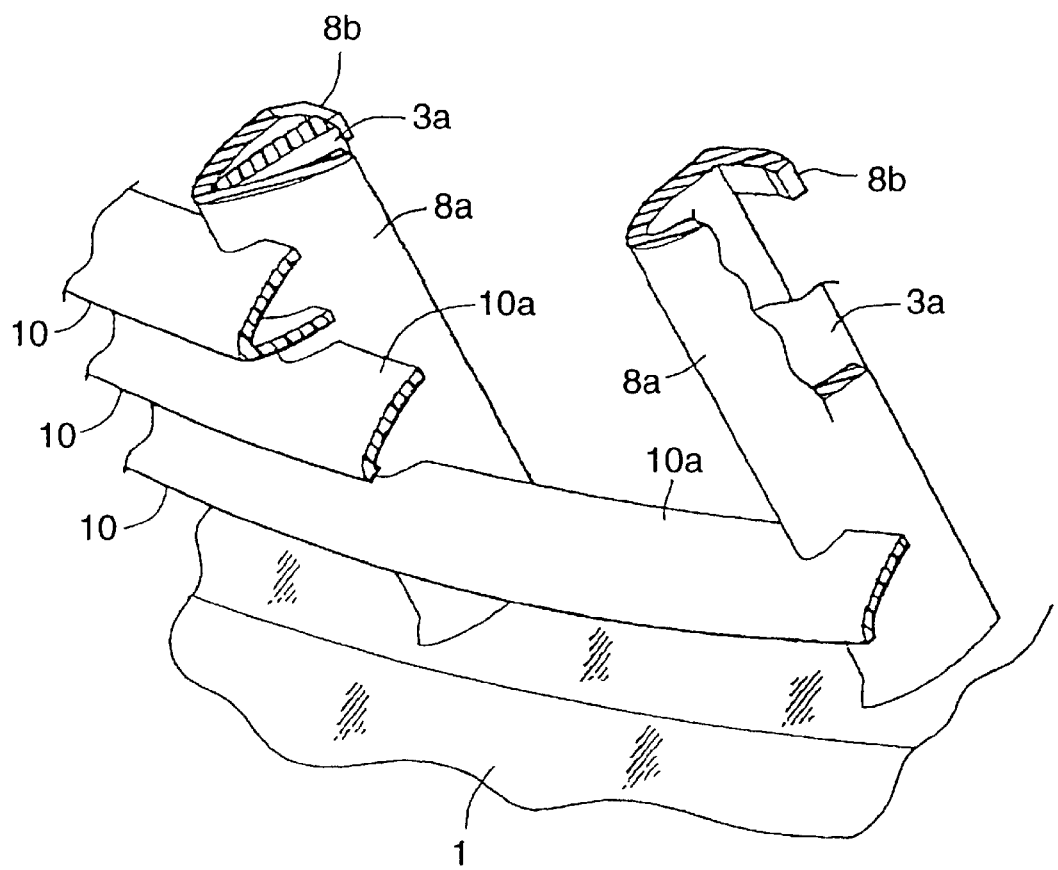
FIG. 4 is a partial perspective view of a bumper louver with main portions thereof being cut so as to show cross sections thereof.
Figure 5:
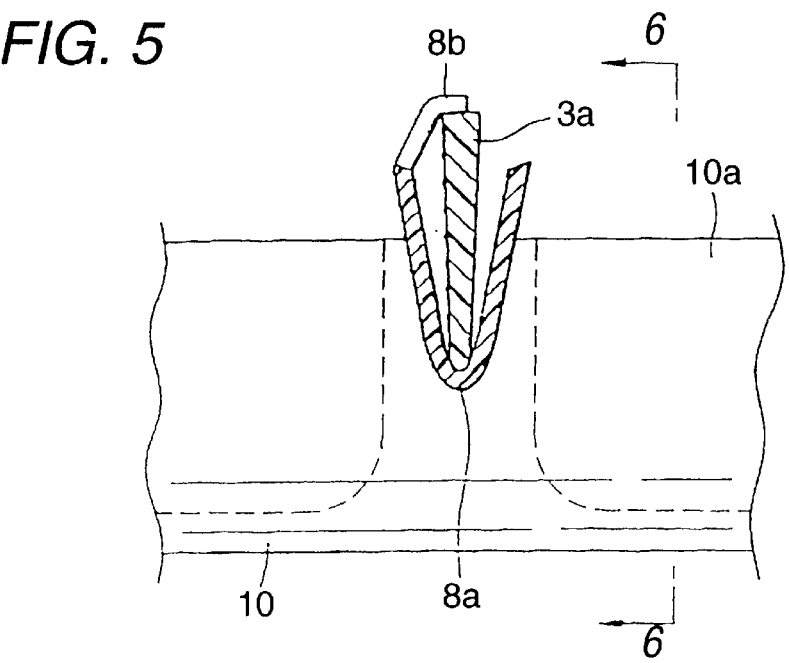
FIG. 5 is a partial plan view of the bumper louver with main portions thereof being cut to show cross sections thereof.
Figure 6:
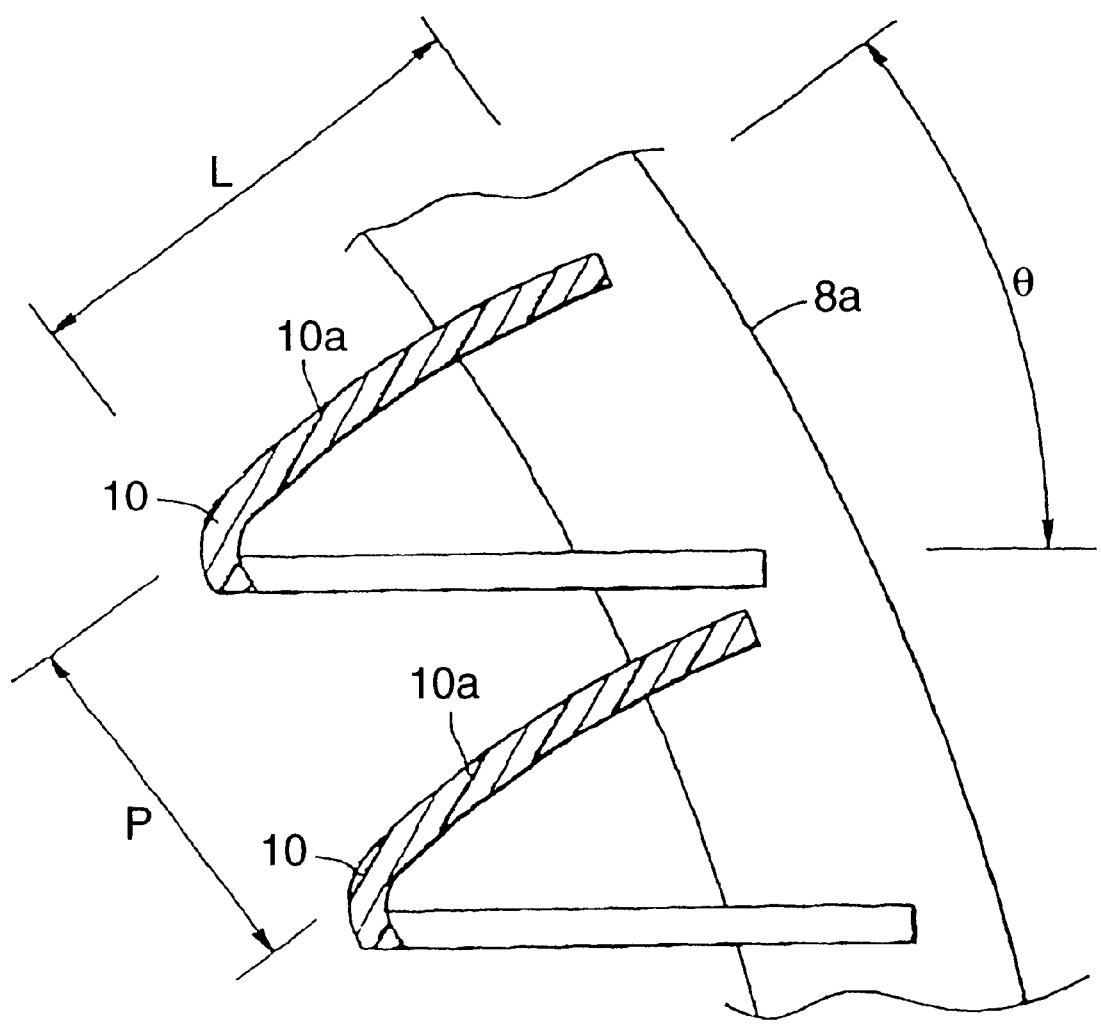
FIG. 6 is a cross section taken along the line 6—6 of FIG. 5.

As shown in FIGS. 4 to 6, the air duct plates 10 are formed so as to have a cross section of a V-shape which is laid on its side in the vicinity of the vertical bars 8a so that the air duct plates 10 are made integral with the vertical bars 8a at free ends of the substantially V-shape with a front acute angled portion of the V-shape being made to protrude toward the front side of the vehicle body. Thus, the air duct plates 10 are connected to the vertical furring strips 3a via the vertical bars 8a. As shown better in FIG. 6, a lower part of the turned V-shape of each cooling air duct plate 10 is cut between the respective vertical bars 8a and therefore a slope extending rearward relative to the vertical direction of the vehicle body in an inclined fashion is formed by an upper portion of the turned V-shape.

Thus, in the air duct plates 10 which are each formed into a plate-like shape between the vertical bars 8a, since the frontward protruding end portions thereof are caused to rotrude frontward largely relative to the vertical bars 8a, the influence by the vertical bars 8a upon the cooling air flow straightening effect by the air duct plates 10 can be reduced as low as possible. In addition, the reduction in rigidity of the supporting portions of the air duct plates 10 that would be caused by the aforesaid construction of the air duct plates 10 can be compensated for by allowing the free ends of the V-shapes to connect to the vertical bars, and since this construction is something like supporting the air duct plates 10 at two points of a triangle, the rigidity of the supporting portions can be increased, thereby making it possible to increase the supporting rigidity of the air duct plates 10.

The bumper louver 8 according to the illustrated example is screwed to the front bumper at the tree positions as previously described, and the vertical bars 8a are formed into a shape allowing them to be temporarily locked to the vertical furring strips 3 before the bumper louver 8 is screwed to the front bumper 1. Namely, as shown in FIG. 5, the vertical bar 8a is formed so as to have a V-shaped cross section to cover the vertical furring strip 3a from the front of the vehicle body and has at one of the free ends of the V-shape an engagement piece 8b adapted to be elastically engaged with a rear portion of the vertical furring strip 3a. Thus, the vertical furring strip 3a is accommodated in the vertical bar 8a such that the vertical furring strip 3a is held between the bottom of a V-shaped groove of the vertical bar 8a and the engagement piece 8b in the longitudinal direction as shown in FIG. 5, whereby the vertical bar 8a can be brought into engagement with the vertical furring strip 3a. Thus, after the temporary engagement of the vertical bar 8a to the vertical furring strip 3a is completed, then the bumper lover 8 is screwed to the front bumper 1, this facilitating the fixing operation of the bumper louver 8 to the front bumper 1.

Thus, with the bumper louver 8 attached to the front bumper 1 as described above, when a flow of air enters the inside of the vehicle body from the front of the front bumper 1 via the opening 3 as shown by a solid line in FIG. 3, a part of the cooling air so entering is guided toward the central portion of the radiator 5 as shown by dotted lines in the same figure by the air duct plates 10 as the cooling air flows along the air duct plates 10. This allows the central portion of the radiator 5 which is positioned rearward of the bumper beam 7 to be exposed to the cooling air in a preferred fashion as well, whereby the whole area of the radiator 5 can uniformly be supplied with cooling air, the cooling efficiency of the radiator 5 being thereby improved.

In addition, as to the frontal projection area of the vehicle body, the opening 3 is in general closed by the air duct plates 10 when viewed from the front of the vehicle body, and this reduces the amount of air that enters the inside of the vehicle body through the opening 3, and therefore the CD value can be improved when compared with the conventional example in which the bumper grille is simply provided in the opening. A closed state like this does not have to be closed perfectly but may be closed to such an extent that a part of the interior of the vehicle body can be seen there through when viewed from the front thereof. Note that even if the amount of air entering the inside of the vehicle body is reduced, since the velocity of the air flow is increased by virtue of the air flow straightening effect of the air-duct plates 10, there is no risk of the cooling efficiency of the radiator 5 being reduced. In addition, since the wind velocity distribution is uniformed in general, the level of the average wind velocity is increased.

As to the CD value, an optimum value can be obtained using the inclined angle θ of the cooling air duct plate 10, the length L of the cooling air duct plate 10 in the direction of air flow and the pitch (interval) P of the respective air duct plates 10 as parameters but the CD value is determined while considering the cooling effect. For example, these parameters may be determined such that much importance is placed on the cooling effect for the car models supplied to regions where high-speed driving is not popular, whereas for car models marketed in regions where high-speed driving is popular, more importance is placed on the CD value.

Note that while the bumper louver 8 is described as being formed separately from the front bumper 1 for attachment thereto in the above illustrated example, according to the invention, the air duct plates 10 inclined at the inclined angle may be formed integrally with the front bumper 1 so that the bumper louver is provided integrally with the front bumper 1. Even in this case, advantages similar to those described above can also be obtained.

Next, a cooling structure according to a second embodiment of the invention will be described.

Figure 7:
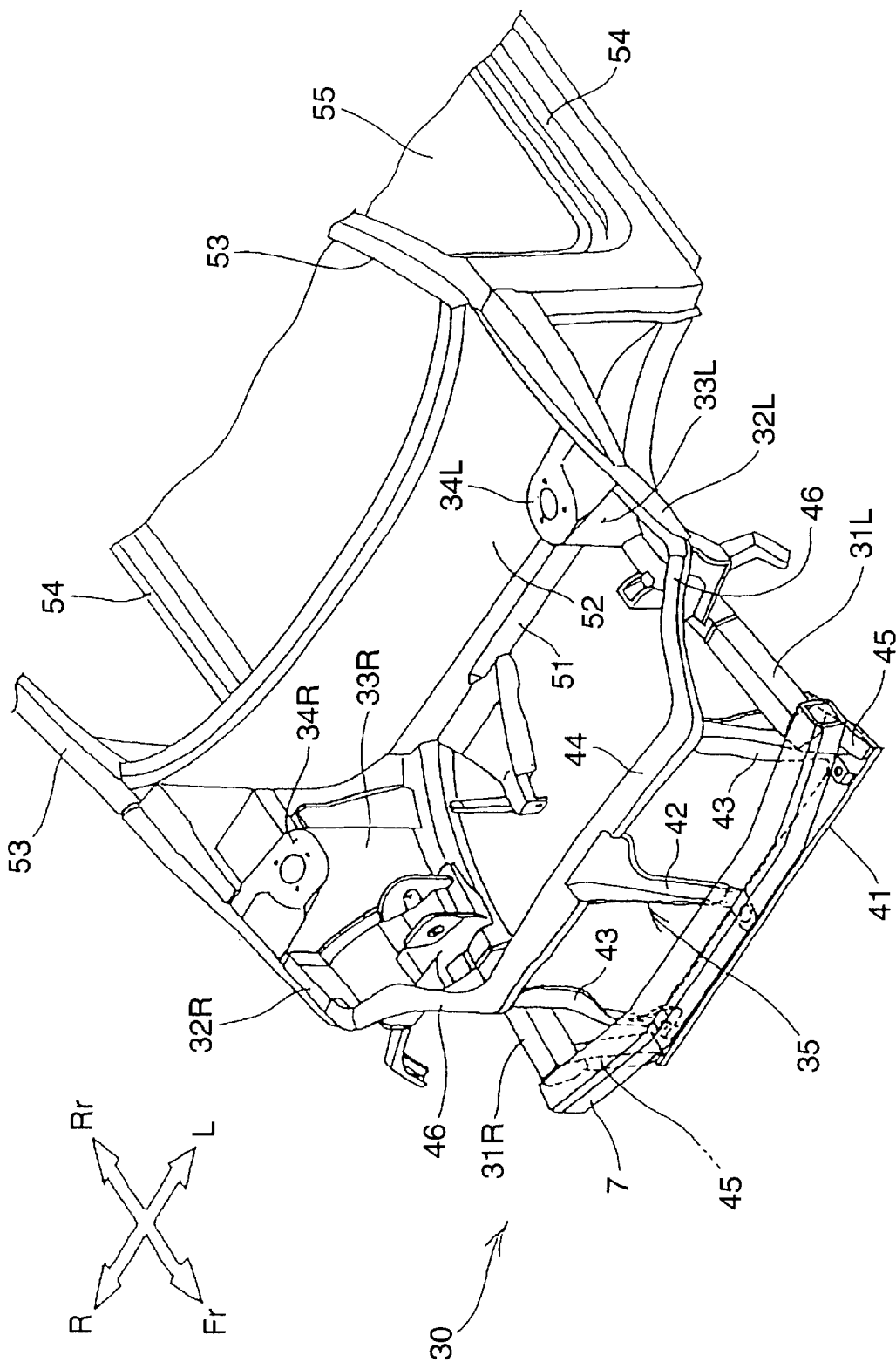
FIG. 7 is a perspective view showing a vehicle to which a second embodiment of the invention is applied.

FIG. 7 is a perspective view of a front part of the body of a vehicle adopting a cooling structure according to a second embodiment of the invention, showing the construction of a front part of a body frame 30.

The construction of the front part of the body frame (the body of the vehicle) 30 adopts a monocoque body comprising mainly left and right front side frames 31L, 31R extending longitudinally of the body on sides of the front part of the body, left and right upper members 32L, 32R disposed transversely outwardly of and obliquely above the front side frames 31L, 31R and extending longitudinally of the body, wheel houses 33L, 33R disposed so as to extend between the front side frames 31L, 31R and the upper members 32L, 32R and front damper housings 34L, 34R, a front bulkhead 35 joined to the front portions of the front side frames 31L, 31R and the front portions of the left and right upper members 32L, 32R and a front bumper beam 7 extending transversely and attached to the front ends of the left and right front side frames 31L, 31R. The body frame 30 is formed of aluminum or aluminum alloy material.

The front bulkhead 35 comprises a front lower cross member 41 extending transversely at the front of and below the left and right front side frames 31L, 31R, a center stay 42 extending upwardly from a transversely central portion of the front lower cross member 41, left and right side stays 43, 43 extending upwardly from end portions of the front lower cross member 41 and a front upper cross member 44 extending transversely so as to join with an upper end of the center stay 42 and upper ends of the side stays 43, 43.

The front lower cross member 41 is a cross member having left and right extension stays 45, 45 provided at portions where the front lower cross member 41 joins with lower end portions of the side stays 43, 43 and functions to support a radiator and a condenser which will be described later. These left and right extension stays 45, 45 branch off the lower end portions of the side stays 43, 43 and extend upwardly until upper end portions of the side stays 43, 43. The extension stays 45, 45 join with the front portions of the left and right front side frames 31L, 31R at the upper portions thereof, respectively. The front lower cross member 41 is allowed to extend between the front end portions of the front side frames 31L, 31R via the left and right extension stays 45, 45.

The front upper cross member 44 has extensions 46, 46 provided at left and right ends thereof so as to extend therefrom rearward until they join with front end portions of the left and right upper members 32L, 32R, respectively.

In FIG. 7, reference numeral 51 denotes a dash panel lower cross member, 52 denotes a dash panel, 53, 53 denote front pillars, 54, 54 denote side sills and 55 denote a floor panel.

Figure 8:
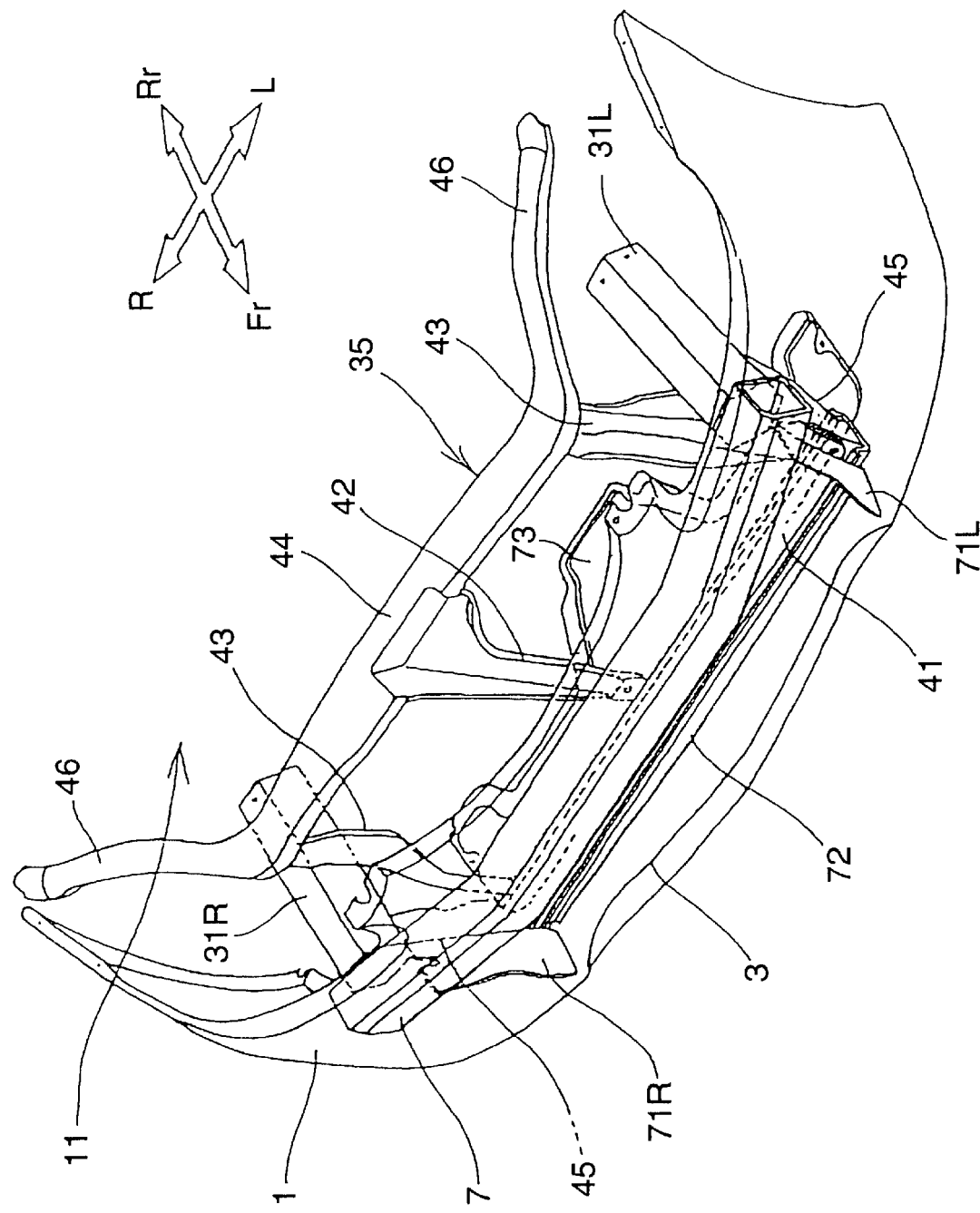
FIG. 8 is a perspective view of a front bumper and portions around a front bulkhead according to the second embodiment of the invention.

FIG. 8 is a perspective view of a bumper face and portions around the front bulkhead according to the second embodiment of the invention, showing that the bumper beam 7 at the front part of the body and the front bulkhead 35 are covered by a front bumper 1.

Figure 9:
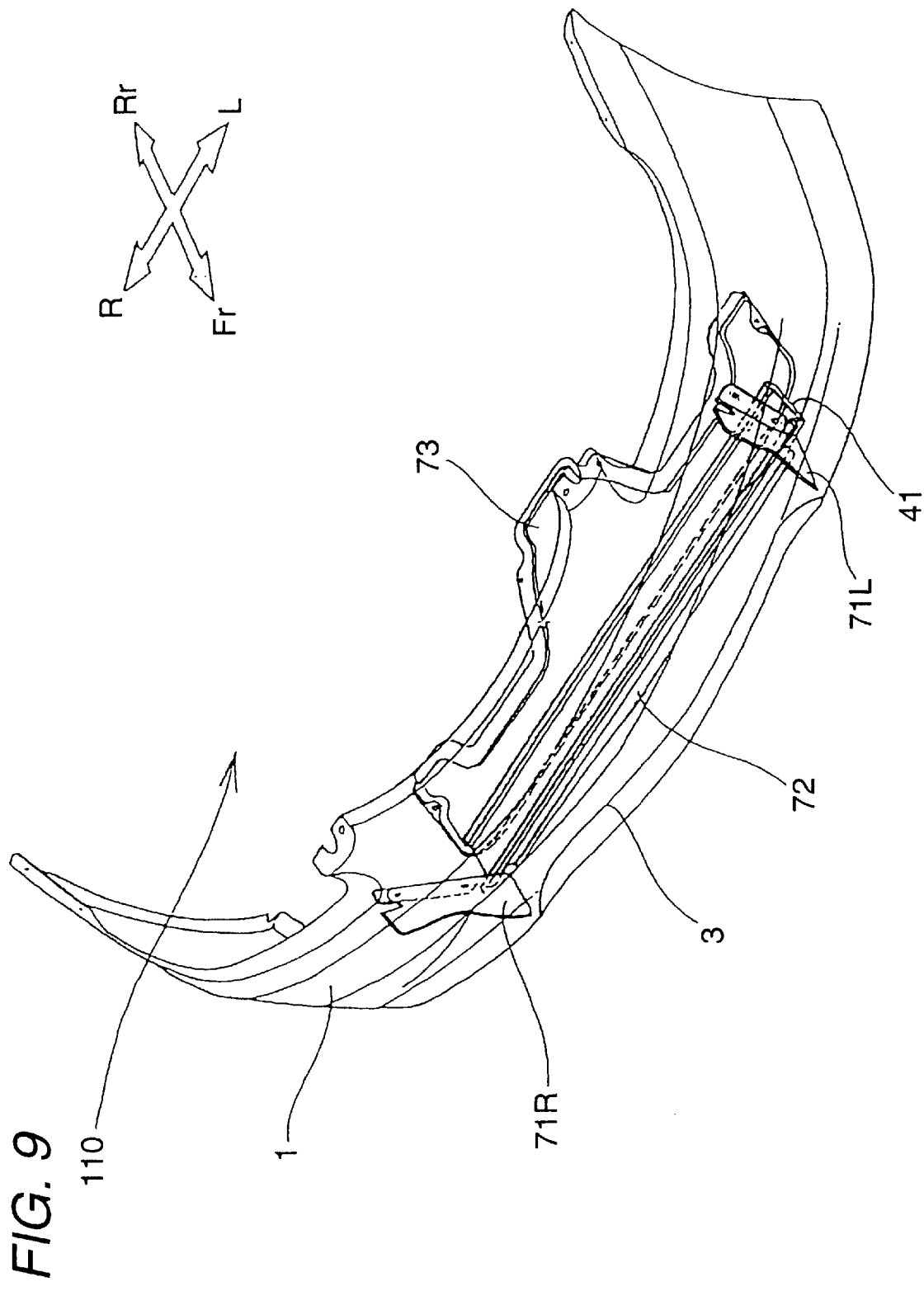
FIG. 9 is a perspective view of portions around the front bumper according to the second embodiment of the invention.

FIG. 9 is a perspective view of portions around the bumper face according to the second embodiment of the invention.

As shown in FIG. 9, in order to guide running wind introduced from an opening 3 as shown in FIGS. 1 to 3 toward a radiator 5, left and right guide plates 71L, 71R and a lower guide plate 72 are disposed on a back side of the front bumper 1 and an under cover 73 is disposed at a rear bottom portion of the front bumper 1. This under cover 73 is a cover adapted to cover a front bottom portion of the body, and the cover 73 covers, for example, at least a portion around a bottom portion of an engine (not shown) at a bottom portion of an engine compartment 110 behind the front bumper 1.

Figure 10:
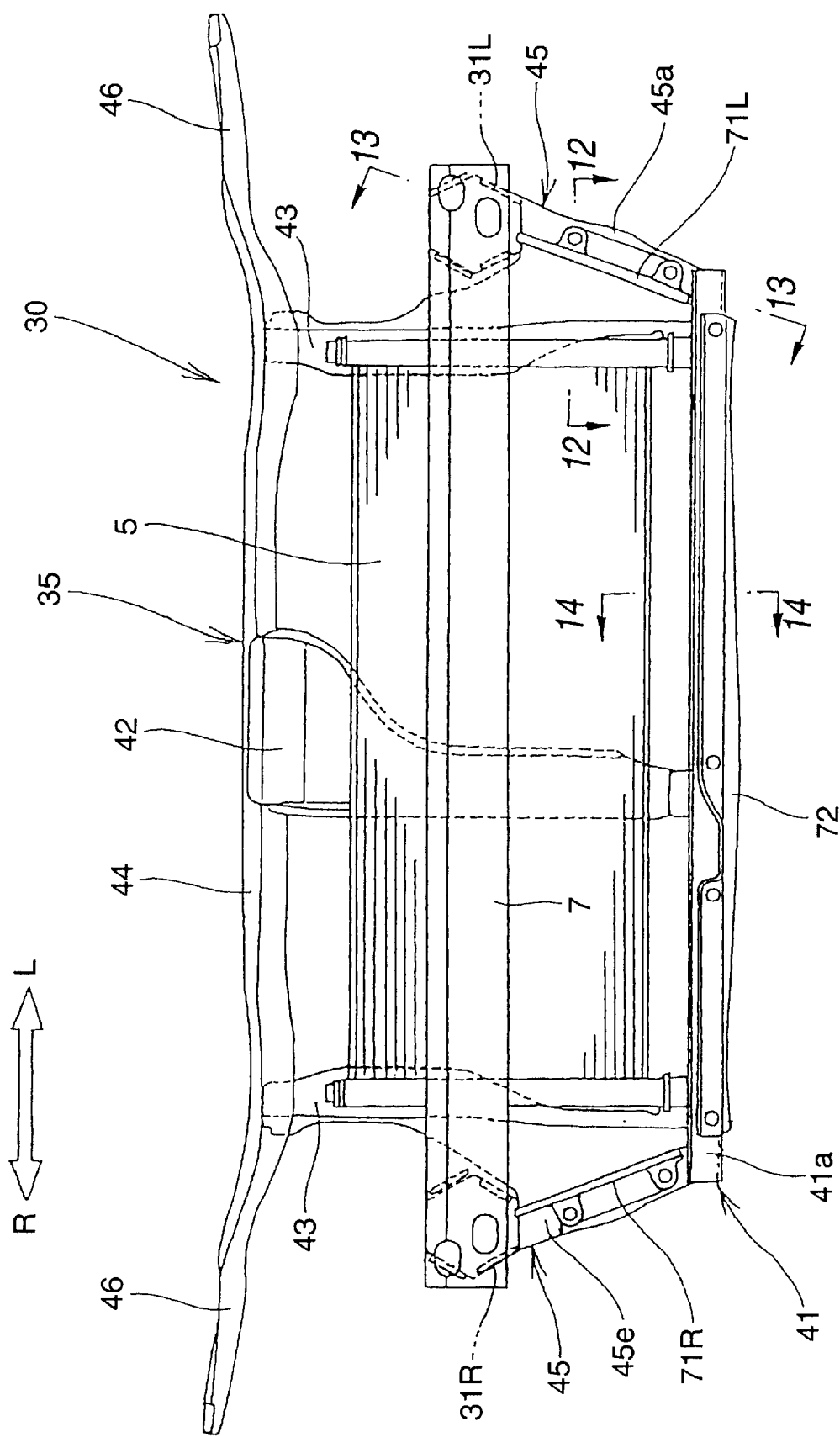
FIG. 10 is a front view of a front part of the body according to the second embodiment of the invention.

FIG. 10 is a front view of the front part of the body frame according to the second embodiment of the invention, showing that a radiator 5 for a water-cooled engine is attached to the front bulkhead 35, the left and right guide plates 71L, 71R are provided along front sides 45a, 45a of the extension stays 45, 45 and the lower guide plate 72 is provided along a front side 41a of the front lower cross member 41.

Figure 11:
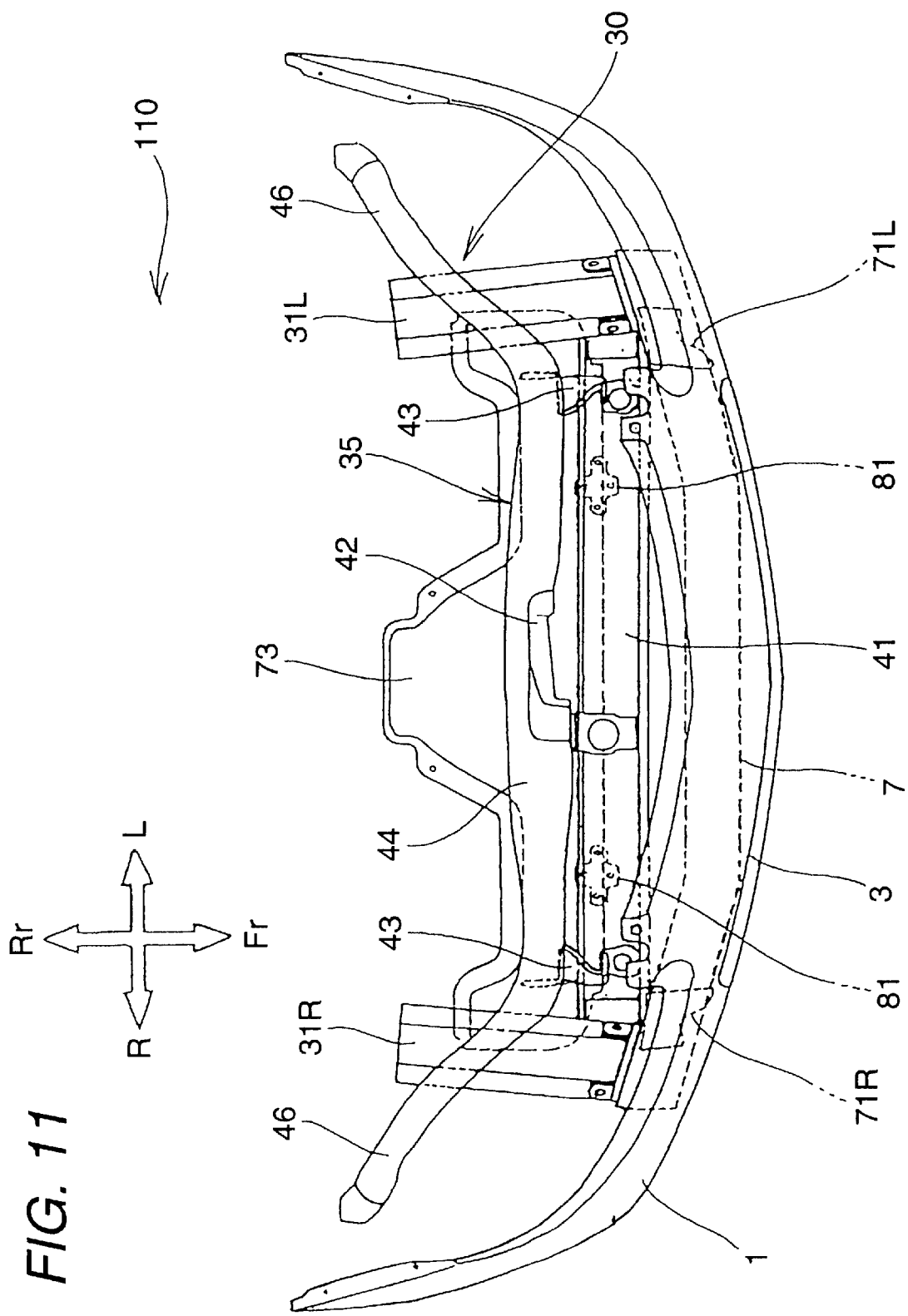
FIG. 11 is a plan view of the front part of the body and portions around the front bumper according to the second embodiment of the invention.

FIG. 11 is a plan view of the front part of the body frame and portions around the front bumper 1 according to the second embodiment of the invention, showing a positional relationship as viewed from the top of the front bumper 1, the left and right front side frames 31L, 31R, the front bulkhead 35, the left and right guide plates 71L, 71R and the under cover 73.

Figure 12:
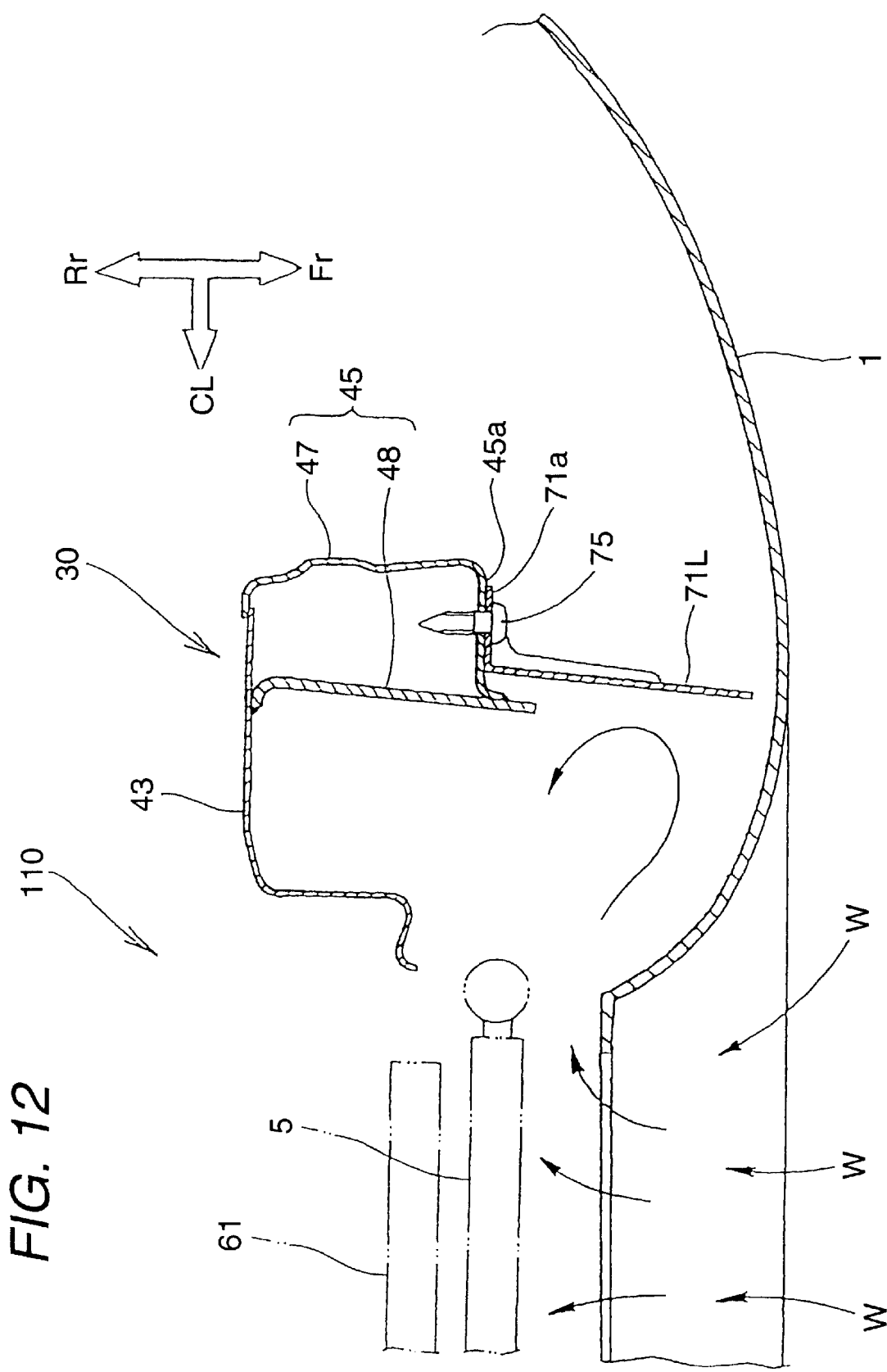
FIG. 12 is a cross-sectional view taken along the line 12—12 of FIG. 10.

FIG. 12 is a cross-sectional view taken along the line 12—12 of FIG. 10 showing that the radiator 5 and a condenser 61 for an air conditioner, both of which are indicated by imaginary lines, are disposed on the back side of the front bumper 1.

FIG. 12 further shows cross-sectional constructions as viewed from the top of the left side stay 43 and the left extension stay 45. The left extension stay 45 is a vertically elongate stay having a rectangular closed cross section as viewed from the top formed by the left side stay 43, a stay portion 47 and a side stiffener 48.

The left guide plate 71L is an erect resin plate having a flange 71a and is adapted to close a gap between the front bumper 1 and the left extension stay 45 by attaching the flange 71a to the left extension stay 45 with a machine screw 75.

Since it is the resin guide plate, the left guide plate 71L can be deformed when it receives impact energy from the front of the body via the front bumper 1 or when the front bumper 1 touches the ground, and therefore the left side stay 43 and the left extension stay 45 both of which are part of the body frame 30 are never affected. Furthermore, since it is retained with the machine screw, the left guide plate 71L can be free to be detached, this facilitating replacement of components.

The constructions of the right side stay 43, the right extension stay 45 and the right guide plate 71R shown in FIG. 10 are identical to those of the left side stay 43, the left extension stay 45 and the left guide plate 71 except that the former is transversely symmetrical with the later.

Figure 13:
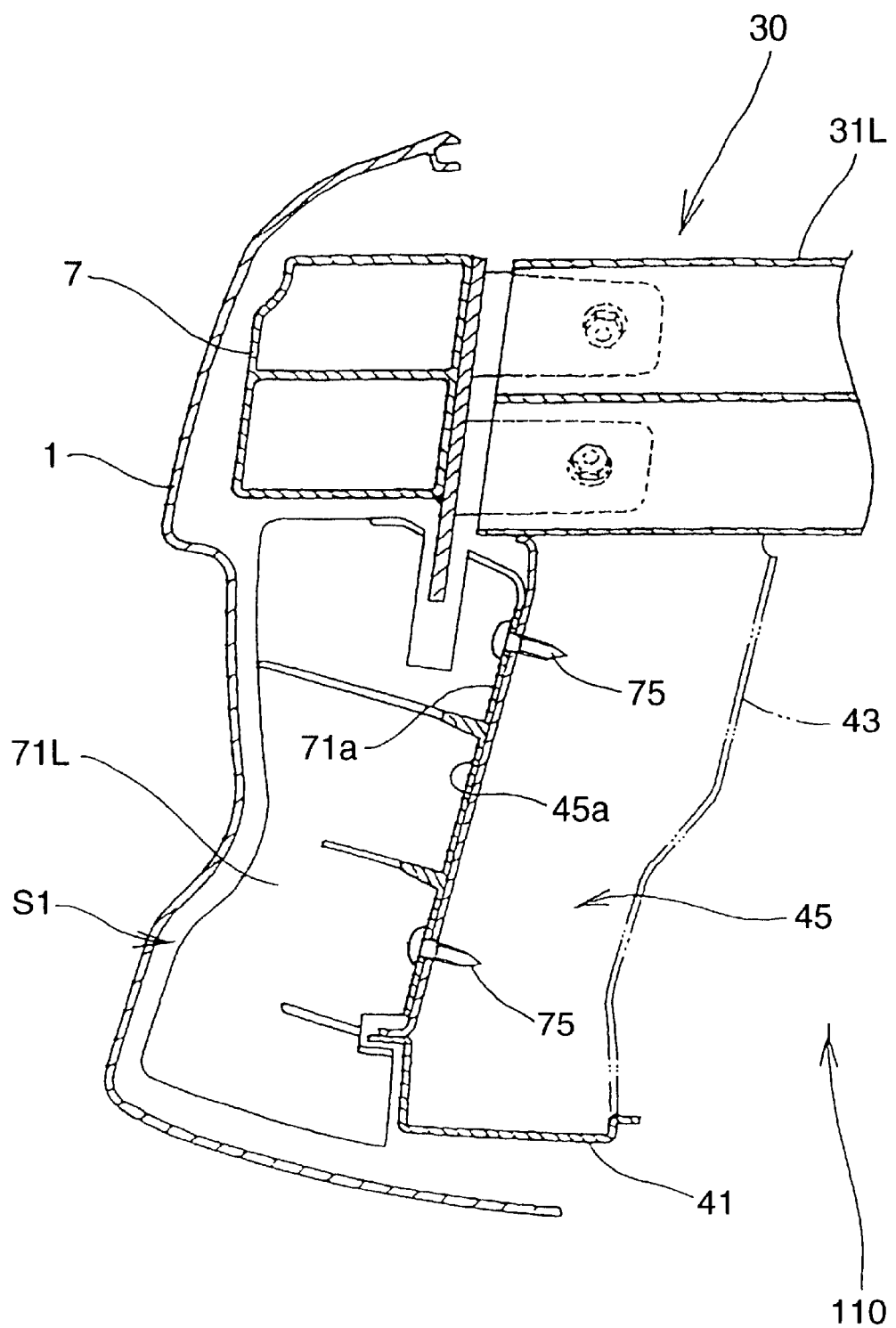
FIG. 13 is a cross-sectional view taken along the line 13—13 of FIG. 10.

FIG. 13 is a cross-sectional view taken along the line 13—13 of FIG. 10, showing that a gap Si between the front bumper 1 and the left guide plate 71L is made smaller by allowing the contour of the left guide plate 71L to conform to the cross-sectional configuration of the front bumper 1.

The left guide plate 71L extends over a range from the bumper beam 7 to the front lower cross member 41 and is retained to the left extension stay 45 at two positions with machine screws.

Figure 14:
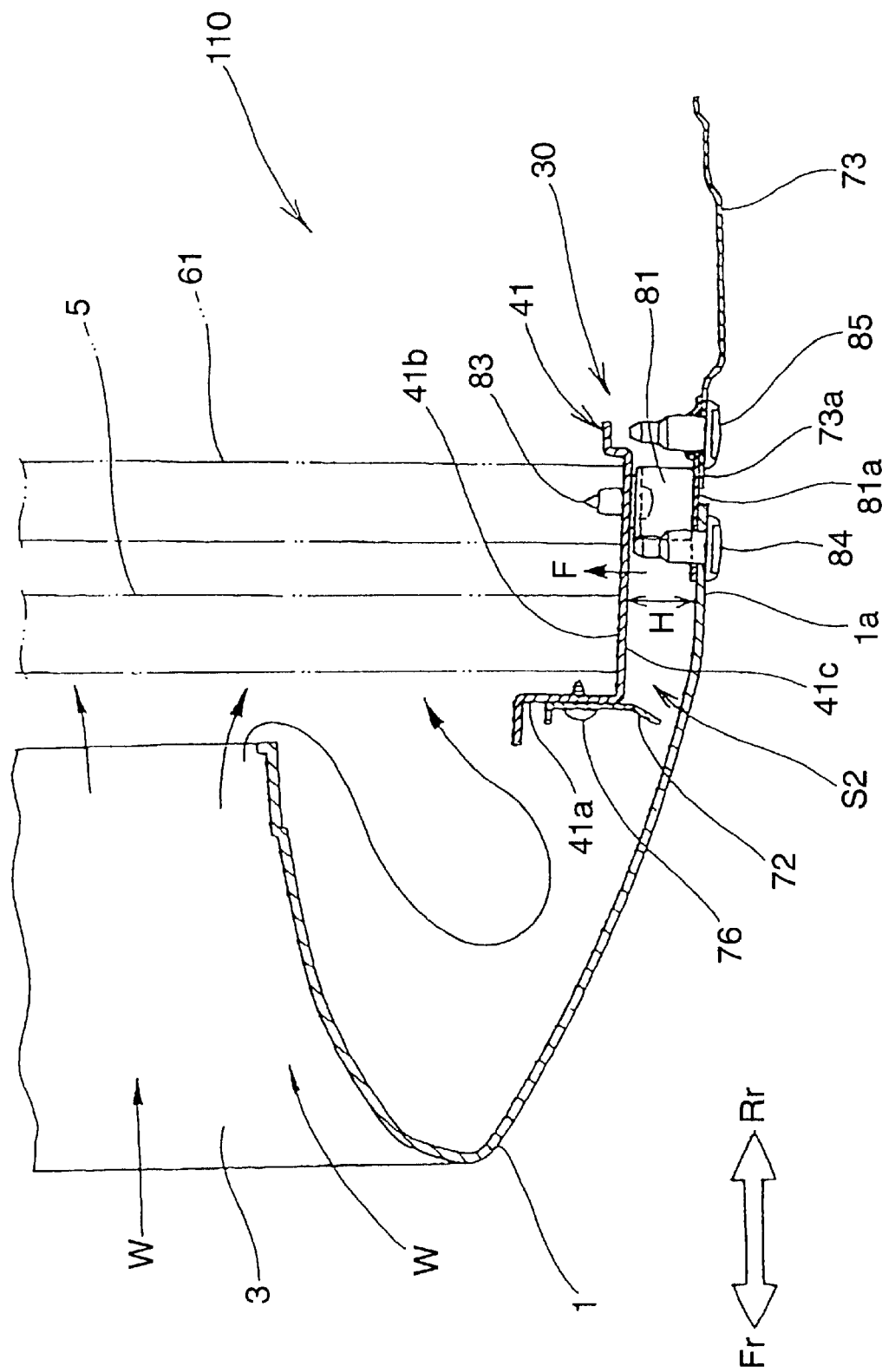
FIG. 14 is a cross-sectional view taken along the line 14—14 of FIG. 10.

FIG. 14 is a cross-sectional view taken along the line 14—14, showing that the front lower cross member 41 is formed as a member having a substantially U-shaped cross section and hence made open at the top thereof and that a gap S2 between a lower side 41c of this member and a lower portion 1c of the front bumper 1 is closed with the lower guide plate 72.

The front lower cross member 41 is detachably attached at a lower portion 41b thereof with a machine screw 83 to a bracket 81 which is allowed to extend downwardly by a predetermined distance (height) H from the lower side 41c thereof.

The lower portion 1a of the front bumper 1 extends toward below the front lower cross member 41 while surrounding the same and is detachably attached to a front portion on a lower side 81a of the bracket 81 with a fastening member 84 such as a clip and a machine screw, or the like. In addition, a front portion 73a of the under cover 73 extends toward below the front lower cross member 41 along the bottom of the body and is detachably attached to a rear portion on the lower side 81a of the bracket 81 with a fastening member 85 such as a clip and a machine screw, or the like.

Figure 15:
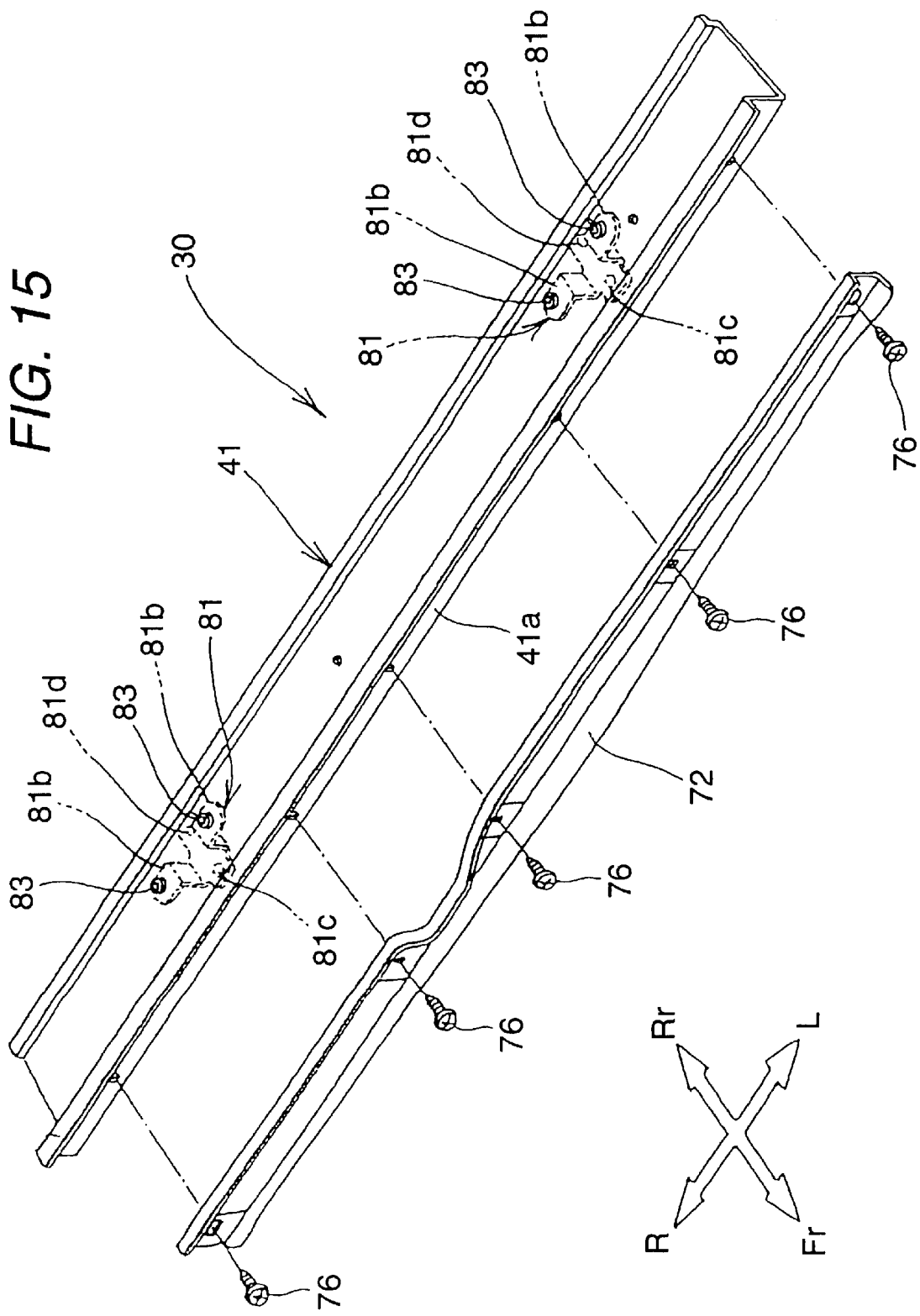
FIG. 15 is a perspective view of a front lower cross member, a lower guide plate and brackets according to the second embodiment of the invention.
Figure 16:
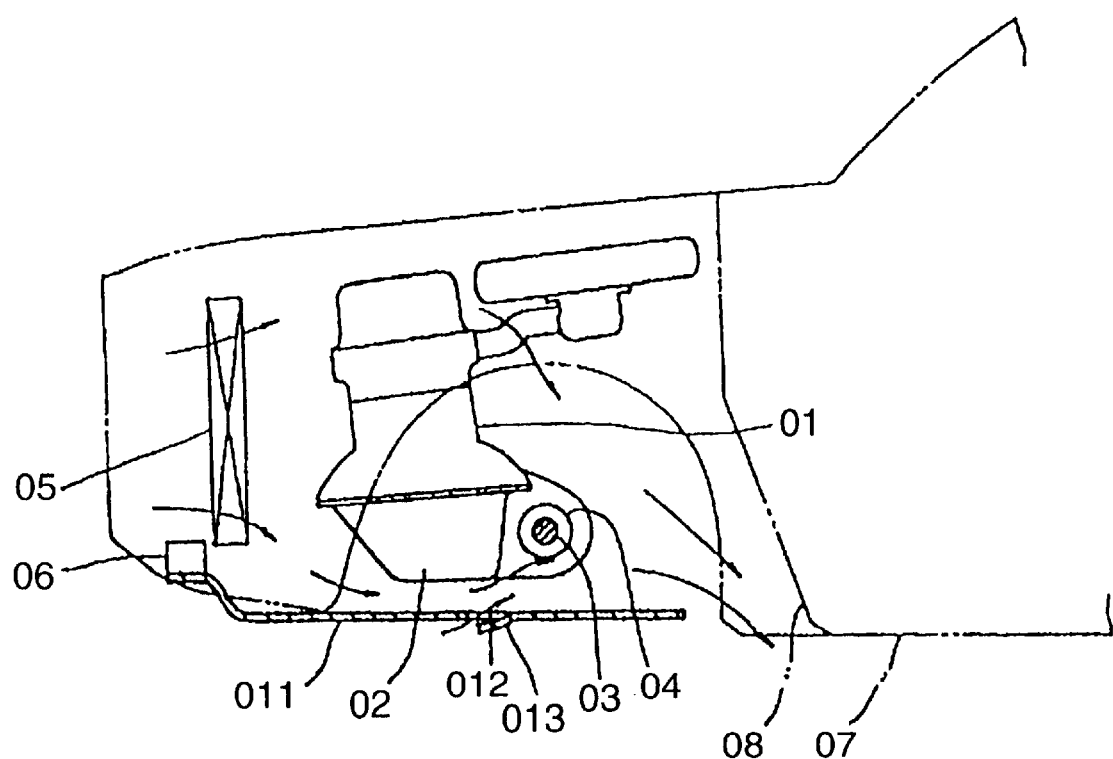
FIG. 16 is a diagram showing a conventional vehicle cooling structure with main portions thereof being cut to show cross sections thereof.

FIG. 15 is a perspective view of the front lower cross member, the lower guide plate and the bracket according to the second embodiment of the invention.

The lower guide plate 72 is an elongated resin plate having a length substantially equal to that of the front lower cross member 41 and is adapted to be attached to the front side 41a of the front lower cross member 41 with a plurality of machine screws 76, . . . (hereinafter, ". . ." denotes plurality).

Since it is the resin guide plate, the lower guide plate 72 is free to be deformed when it receives impact energy from the front of the body via the front bumper 1 or it touches the ground, and therefore the front lower cross member 41, which is part of the body frame 30, is not affected. Moreover, since it is attached with the machine screws, the lower guide plate 72 can easily be detached, this facilitating replacement of components.

Additionally, FIG. 15 shows that two, left and right small brackets 81, 81 are disposed on the front lower cross member 41. The bracket 81 is a member having a substantially U-shaped cross section as viewed from the front thereof and made open at the top thereof, and flanges 81b, 81b are formed integrally at left and right upper ends of the member for attachment to the front lower cross member 41 with machine screws.

A bracket 81 as described above is made of aluminum or aluminum alloy material (an aluminum product) or is a resin product, and the rigidity against an upward load of the bracket is set to be smaller than that of the front lower cross member 41. Since it is an aluminum product or a resin one, the bracket 81 is light in weight and low in cost. In FIG. 15, reference numeral 81c denotes a bumper face attaching hole and 81d denotes an under cover attaching hole.

Referring to FIGS. 10, 12 and 14, operations of the left and right guide plates 71L, 71R and the lower guide plate 72 will be described below.

In FIG. 12, running air W introduced from the opening 3 is guided toward the radiator 5 and the condenser 61 by the left guide plate 71L. In addition, in FIG. 14, running air W introduced from the opening 3 is guided toward the radiator 5 and the condenser 61 by the lower guide plate 72. This is also true with the right guide plate 71R shown in FIG. 10. Thus, running air W introduced from the opening 3 can aggressively be guided toward the radiator 5 and the condenser 61 by the left and right guide plates 71L, 71R (refer to FIGS. 10, 12) and the lower guide plate 72 (refer to FIG. 14). This helps reduce the amount of running wind (or so-called bypassing air) trying to enter the engine compartment 110 without passing through the radiator 5 and the condenser 61. Thus, the radiator 5 and the condenser 61 can be cooled more efficiently by allowing a sufficient amount of running air to be taken into the radiator 5 and condenser 61.

Moreover, since the amount of bypassing air is reduced, the air resistance subjected to a vehicle while running is reduced, this eventually improving the running performance of the vehicle.

Furthermore, since the bypassing air is reduced, the amount of snow penetrating into the engine compartment 110 while the vehicle is running is also reduced, whereby various apparatuses within the engine compartment 110 can be prevented from being frozen more effectively.

In addition, the left and right guide plates 71L, 71R and the lower guide plate 72 may be such that they are adapted to guide running air W introduced from the opening 3 toward the radiator 5 and the condenser 61 aggressively.

Furthermore, the attaching constructions of the left and right guide plates 71L, 71R and the lower guide plate 72 relative to the front bulkhead 35 may be such that they are detachable from the front bulkhead 35.

Note that since the cooling structure according to the second embodiment of the invention adopts the cooling structure according to the first embodiment, namely, since the construction of the opening 3 employed in the second embodiment is identical to that described in the first embodiment, the construction according to the second embodiment can enjoy the operations and effectiveness of both the first and second embodiments.

In addition, in the second embodiment of the invention, the configuration and size of the opening 3 may be optionally determined.

According to the first embodiment of the invention, even if the opening is formed in the front bumper at the position facing to the lower portion of the radiator, cooling air can be guided toward the central portion of the radiator by means of the air duct plates, whereby not only can the radiator preferably be cooled but also the opening can be shielded by the air duct plates when viewed from the front, thereby-making it possible to improve the CD value. In addition, the front protruding ends of the air duct plates are made to protrude frontward relative to the vertical bars so as to improve the straightening effect of the air duct plates while ignoring the influence by the vertical bars thereupon, and the air duct plates are connected to the vertical furring strips at the free ends of the substantially V-shapes whereby the reduction in rigidity of the air duct plates can be prevented which would be resulting when the frontward protruding ends of the air duct plates are made to protrude frontward.

According to the second embodiment of the invention, since the left and right guide plates and the lower plate which are all adapted to guide running air introduced from the opening toward the radiator for the water-cooled engine are attached to the front bulkhead, running air introduced from the opening adopted in the first embodiment can aggressively be guided toward the radiator by the left and right guide plates and the lower guide plate. As a result of this, the amount of running air entering into the engine compartment without passing through the radiator, or the so-called bypassing air can be reduced. Thus, the radiator can be cooled more efficiently by allowing the sufficient amount of running air to be taken into the radiator.

Moreover, since the bypassing air can be reduced, the air resistance subjected to the vehicle while running is reduced, this eventually improving the running performance of the vehicle.

Furthermore, since the bypassing air can be reduced, the amount of snow penetrating into the engine compartment while the vehicle is running can be reduced, whereby various types of apparatuses within the engine compartment can be prevented from being frozen more effectively.

In addition, since the left and right guide plates and the lower guide plate can detachably be attached to the front bulkhead, the replacement of these plates can be facilitated.

What is claimed is:

1. A vehicle cooling structure comprising:
   a body;
   a front bumper provided in front of said body;
   a portion defining an opening formed in said front bumper;
   a radiator provided in an inside of a front portion of said body;
   a bumper louver provided in said opening;
   wherein said bumper louver includes substantial horizontal air duct plates for guiding cooling air toward said radiator and said air duct plates are provided in an inclined fashion so as to shield said opening when viewed from the front of the vehicle and vertical bars attached to said air duct plates;
   said vehicle cooling structure further comprising a plurality of vertical furring strips provided in said opening and affixed to said bumper, wherein said bumper louver vertical bars are configured for receiving and attachment to said vertical furring strips, wherein said air duct plates are formed integrally with said vertical bars in such a manner as to extend across said vertical bars.

2. The vehicle cooling structure according to claim 1, wherein said air duct plates have substantially V-shaped cross sections in the vicinity of said vertical bars and are connected to said vertical furring strips at free ends of the substantially V-shaped cross sections.

3. The vehicle cooling structure according to claim 1, wherein said vertical furring strips are formed integrally with said front bumper.

4. The vehicle cooling structure according to claim 1, wherein said vertical bars respectively have an engagement piece adapted to be elastically engaged with a rear portion of said vertical furring strip.

5. The vehicle cooling structure according to claim 1, wherein said bumper louver is detachably secured to said front bumper with attaching members.

6. The vehicle cooling structure according to claim 1, further comprising a guide plate disposed in at least one of left, right and lower positions in a front of said radiator.

7. The vehicle cooling structure according to claim 6, further comprising a front bulkhead provided in front of said radiator so as to be covered with said bumper louver, wherein said guide plates are detachably attached to said front bulkhead.

8. The vehicle cooling structure according to claim 6, wherein said guide plate is made of a resin.

9. The vehicle cooling structure according to claim 1, wherein said air duct plates have substantially V-shaped cross sections in the vicinity of said vertical bars and are connected to said vertical furring strips at free ends of the substantially V-shaped cross sections, and wherein said substantially V-shaped cross sections terminate outside the vicinity of said vertical bars.

10. The vehicle cooling structure according to claim 1, wherein said air duct plates have substantially V-shaped cross sections only in the vicinity of said vertical bars and are connected to said vertical furring strips at free ends of the substantially V-shaped cross sections.

11. A vehicle cooling structure comprising:
 a front bumper attachable to a front of a vehicle body;
 a portion defining an opening formed in said front bumper;
 a bumper louver provided in said opening;
 wherein said bumper louver includes substantially horizontal air duct plates for guiding cooling air said air duct plates being provided in an inclined fashion, and vertical bars attached to said air duct plates;
 said vehicle cooling structure further comprising a plurality of vertical furring strips provided in said opening and affixed to said bumper, wherein said bumper louver vertical bars are configured for receiving and attachment to said vertical furring strips, and wherein said air duct plates extend across said vertical bars.

12. The vehicle cooling structure according to claim 11, wherein said air duct plates have substantially V-shaped cross sections in the vicinity of said vertical bars and are connected to said vertical furring strips at free ends of the substantially V-shaped cross sections.

13. The vehicle cooling structure according to claim 11, wherein said air duct plates have substantially V-shaped cross sections in the vicinity of said vertical bars and are connected to said vertical furring strips at free ends of the substantially V-shaped cross sections, and wherein said substantially V-shaped cross sections terminate outside the vicinity of said vertical bars.

14. The vehicle cooling structure according to claim 11, wherein said air duct plates have substantially V-shaped cross sections only in the vicinity of said vertical bars and are connected to said vertical furring strips at free ends of the substantially V-shaped cross sections.

15. The vehicle cooling structure according to claim 11, further comprising attaching means for temporarily attaching said bumper louver to said front bumper.

16. The vehicle cooling structure according to claim 1, wherein said vertical bars are disposed on a downstream side of said air duct plates with respect to a flow of the cooling air.

17. The vehicle cooling structure according to claim 11, wherein said vertical bars are disposed on a downstream side of said air duct plates with respect to a flow of the cooling air.

* * * * *